US008589235B2

(12) United States Patent
Moxley et al.

(10) Patent No.: US 8,589,235 B2
(45) Date of Patent: Nov. 19, 2013

(54) METHOD OF ANSWERING QUESTIONS BY TRUSTED PARTICIPANTS

(75) Inventors: Emily K. Moxley, San Francisco, CA (US); Josh T. Wills, San Francisco, CA (US); Daniel Dulitz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/188,440

(22) Filed: Jul. 21, 2011

(65) Prior Publication Data

US 2012/0060106 A1 Mar. 8, 2012

Related U.S. Application Data

(63) Continuation of application No. 12/752,424, filed on Apr. 1, 2010.

(51) Int. Cl.
*G06F 17/00* (2006.01)

(52) U.S. Cl.
USPC ...................................................... 705/14.73

(58) Field of Classification Search
USPC ...................................................... 705/14.73
See application file for complete search history.

(56) References Cited

U.S. PATENT DOCUMENTS

| | | |
|---|---|---|
| 4,992,940 A | 2/1991 | Dworkin |
| 5,963,965 A | 10/1999 | Vogel |
| 7,155,157 B2 | 12/2006 | Kaplan |
| 7,222,078 B2 | 5/2007 | Abelow |
| 7,418,437 B1 | 8/2008 | Marks |
| 2001/0032244 A1 * | 10/2001 | Neustel .......................... 709/206 |
| 2003/0074353 A1 | 4/2003 | Berkan et al. |
| 2003/0217056 A1 | 11/2003 | Allen et al. |
| 2006/0004601 A1 | 1/2006 | Marks |
| 2006/0174340 A1 | 8/2006 | Santos et al. |
| 2006/0252547 A1 | 11/2006 | Mizrahi et al. |
| 2006/0286530 A1 | 12/2006 | Forrest et al. |
| 2007/0219794 A1 | 9/2007 | Park et al. |
| 2007/0260587 A1 | 11/2007 | Mohan |
| 2007/0288563 A1 | 12/2007 | Karkanias |
| 2008/0160490 A1 | 7/2008 | Gomes et al. |
| 2009/0024615 A1 | 1/2009 | Pedro et al. |

(Continued)

FOREIGN PATENT DOCUMENTS

| | | |
|---|---|---|
| KR | 10-2003-0004162 | 1/2003 |
| KR | 10-2005-0029097 | 3/2005 |
| KR | 10-2005-0088888 | 9/2005 |
| WO | WO 01/53970 | 7/2001 |

OTHER PUBLICATIONS

"Facebook I Help Center", [online] [retrieved on Apr. 1, 2010]. Retrieved from the Internet: <URL: http://facebook.com/help/?page=820>, 1 page.

(Continued)

*Primary Examiner* — Thomas Dixon
(74) *Attorney, Agent, or Firm* — Fish & Richardson P.C.

(57) ABSTRACT

Methods, systems, and apparatus, including computer programs encoded on a computer storage medium, for facilitating online conversation. In one aspect, a method includes determining that a user has submitted a question to be viewed by trusted participants of an online conversation, wherein the trusted participants include the user, one or more advertisers and one or more social network friends of the user, obtaining a reply to the question from one of the trusted participants, and providing the reply to the trusted participants.

16 Claims, 10 Drawing Sheets

(56) References Cited

U.S. PATENT DOCUMENTS

| | | |
|---|---|---|
| 2010/0088180 A1 | 4/2010 | Ventilla et al. |
| 2010/0223250 A1 | 9/2010 | Guha |
| 2011/0047169 A1 | 2/2011 | Leighton et al. |
| 2011/0246910 A1 | 10/2011 | Moxley et al. |
| 2011/0258192 A1 | 10/2011 | Yao et al. |
| 2011/0275047 A1 | 11/2011 | Gomes et al. |
| 2012/0036216 A1 | 2/2012 | Aaltonen et al. |
| 2013/0022954 A1 | 1/2013 | Moxley et al. |

OTHER PUBLICATIONS

No author, "Aardvark joins Google!", [online] Web.archive.org, [retrieved on Feb. 14, 2010], Retrieved from the Internet: <http:web.archive.org/web/20100214011846/http://blog.vark.com/?p=361>, 8 pages.

No author, "American Information Exchange", Wikipedia, [online] [retrieved on May 17, 2012]. Retrieved from the Internet: <URL: http://en.wikipedia.org/wiki/American_Information_Exchange>, 2 pages.

No author, "Beyond the Metaphor: AMIX Builds an Electronic Marketplace", [online] Electronic Services Update, Oct. 1990; [retrieved on May 17, 2012]. Retrieved from the Internet: <http:dialogclassic.com/MainFrame.jsp>, 4 pages.

No author; "Phil Salin and AMIX", dialog file, Dialogclassic.com, Gale/Cengage, Dec. 26, 1991 [online] [retrieved on May 17, 2012]. Retrieved from the Internet: <http:www.dialogclassic.com/MainFrame.jsp>, 3 pages.

Orr, J.N., "Join the Information Economy", dialog file, Dialogclassic.com, CAE v11n4, Apr. 1992, [online] [retrieved on May 17, 2012]. Retrieved from the Internet: <URL: http://www.dialogclassic.com/MainFrame.jsp>, 3 pgs.

"Aardvark", [online][retrieved on Apr. 1, 2010]. Retrieved from the Internet: http://www.vark.com/, 3 pages.

Amiri, H., et al. (2008). "Keyword suggestion using conceptual graph construction from Wikipedia rich documents," International Conference on Information and Knowledge Engineering, Universal Conference Management Systems and Support, California, USA, pp. 63-69.

"Ask and Answer, Rating and Reviews at IMshopping", [online] [retrieved on Apr. 1, 2010]. Retrieved from the Internet: http://www.imshopping.com/, 2 pages.

Authorized Officer Sae Byul Kim, International Search Report and Written Opinion for application No. PCT/US2007/089114, mailed Jun. 4, 2008, 15 pages.

Authorized Officer Ellen Moyse, International Preliminary Report on Patentability for application No. PCT/US2007/089114, mailed Jul. 9, 2009, 11 pages.

"Facebook 1 Help Center", [online] [retrieved on Apr. 1, 2010]. Retrieved from the Internet: http://www.answers.yahoo.com/, 3 pages.

"Google Answers: Frequently Asked Questions", [online] [retrieved on Apr. 1, 2010]. Retrieved from the Internet: http://www.answers.google.com/answers/faq.html, 4 pages.

"Mahalo.com: Human-Powered Search", [online][retrieved on Apr. 1, 2010]. Retrieved from the Internet: http://www.mahalo.com/, 4 pages.

"OKWave Best Answer / Product & Services," [Online] [Downloaded on Aug. 24, 2010]; Retrieved from the Internet at URL: http://www.okwave.co.jp/service/?w=2; 3 pages.

"Quora—Welcome", [online] [retrieved on Apr. 1, 2010]. Retrieved from the Internet: hitp://www.quora.com/, 1 page.

"Yahoo! Answers—Home", [online] [retrieved on Apr. 1, 2010]. Retreived from the Internet: http://www.answers.yahoo.com/, 3 pages.

International Search Report and Written Opinion for application No. PCT/US2011/030886, mailed Jun. 8, 2011, 15 pages.

Needleman, R., "Mycroft: Human-powered grid computing", CNET News [online] Aug. 3, 2006, [retrieved on Nov. 29, 2012]. Retrieved from the Internet: <URL: http://news.cnet.com/8301-10784_3-6101907-7.html>, 4 pages.

PCT Notification Concerning Transmittal of International Preliminary Report on Patentability, PCT/US2011/030886, dated Oct. 11, 2012, 9 pages.

* cited by examiner

METHOD OF ANSWERING QUESTIONS BY TRUSTED PARTICIPANTS

CROSS REFERENCE TO RELATED APPLICATION

This application is a continuation application of, and claims priority to, pending U.S. patent application Ser. No. 12/752,424, filed on Apr. 1, 2010, entitled "Conversational Question and Answer". The disclosure of the foregoing application is incorporated herein by reference in its entirety.

BACKGROUND

This specification generally relates to online conversations.

Search engines provide search results in response to users' queries. While search results often get users 'into the ballpark' of the information that they desire, it is not uncommon for users to have to iteratively reformulate their search queries to find the exact information that they are seeking. Even after running multiple search queries, however, a user may still not locate this specific information.

SUMMARY

According to one innovative aspect of the subject matter described in this specification, a user initiates an online conversation by submitting a question. The question is posed to parties with whom the user is acquainted, as well as to paying third parties. The parties to whom the question is posed may respond with answers to the question or with other comments, thereby providing conversational answering to the user's question.

As used by this specification, an "online conversation," (or "online discussion," "online chat") refers to any appropriate kind of synchronous or asynchronous communication over the Internet or other network, such as communication that occurs using a text-based group chat, an Internet forum, a message board, or a web application or service that manages user-generated content. The conversation may be hosted by any appropriate platform that supports multi-party collaboration.

The parties with whom the user are acquainted may include real people or virtual entities, such as an 'answer bot.' The parties may be those with which the user has an online relationship, such as a social network link, connection or friendship (collectively referred to by this specification as "social network friends"). Parties may be considered to be social network friends when a one party identifies the other as an acquaintance, or when both parties mutually identify each other as an acquaintance.

The paying third parties, referred to by this specification as "advertisers" or "sponsors," are parties that are expected to have special knowledge on a topic of the question, or parties that have paid for the right to answer or otherwise comment on the question. The advertiser's replies may also be supplied by real people or by virtual entities. By answering questions in a conversational environment, advertisers are exposed to additional opportunities for generating leads and for providing offers and customer service.

Collectively, the user, the parties with whom the user are acquainted, and the paying third parties are referred to by this specification as "trusted participants" of the online conversation. By excluding other parties, such as the general public, from the conversation, the techniques described herein provide a community-based framework that largely eliminates poor quality questions and answers.

In general, another innovative aspect of the subject matter described in this specification may be embodied in methods that include the actions of determining that a user has submitted a question to be viewed by trusted participants of an online conversation, where the trusted participants include the user, one or more advertisers and one or more social network friends of the user, obtaining a reply to the question from one of the trusted participants, and providing the reply to the trusted participants. Other embodiments of this aspect include corresponding systems, apparatus, and computer programs, configured to perform the actions of the methods, encoded on computer storage devices.

These and other embodiments may each optionally include one or more of the following features. For instance, the one or more advertisers may be parties that are expected to have special knowledge regarding the question, or parties that have paid to reply the question; the actions may include providing the question to the trusted participants only, or determining that the user has selected a control to submit the question, automatically restating one or more search query terms as a natural language question in response to determining that the user has selected the control, and submitting the natural language question as the question to be viewed by the trusted participants; providing the reply to the trusted participants may include providing the reply to the trusted participants only; the actions may include anonymizing the question, and providing the anonymized question to the one or more advertisers; the actions may include storing the question and the reply in a search engine index; the social network friends may be parties who are acquainted through an online relationship with the user; and/or the actions may include determining a permission level associated with a particular trusted participant, determining that the permission level satisfies a threshold associated with creating, editing, deleting, or applying a label to the reply, and receiving information from the particular trusted participant to create, edit, delete, or apply a label to the reply based on determining that the permission level satisfies the threshold associated with creating, editing, deleting or applying the label to the reply, respectively.

In general, another innovative aspect of the subject matter described in this specification may be embodied in methods that include the actions of obtaining a search query, identifying, by a search engine, resources that are responsive to the search query, where the resources include information that references an online conversation in which a user has submitted questions to be viewed by trusted participants and one or more of the trusted participants has replied to the question, and where the trusted participants include the user, one or more advertisers and one or more social network friends of the user, and providing information that identifies the resources for display. Other embodiments of this aspect include corresponding systems, apparatus, and computer programs, configured to perform the actions of the methods, encoded on computer storage devices. This and other embodiments may each optionally include the actions of determining that the search query was initiated by the user or by one or more of the social network friends of the user, where identifying resources that are responsive to the search query may include identifying, in response to determining that the search query was initiated by the user or by one or more of the social network friends of the user, the resources that are responsive to the search query.

The details of one or more embodiments of the subject matter described in this specification are set forth in the accompanying drawings and the description below. Other

DETAILED DESCRIPTION

Figure 1A:
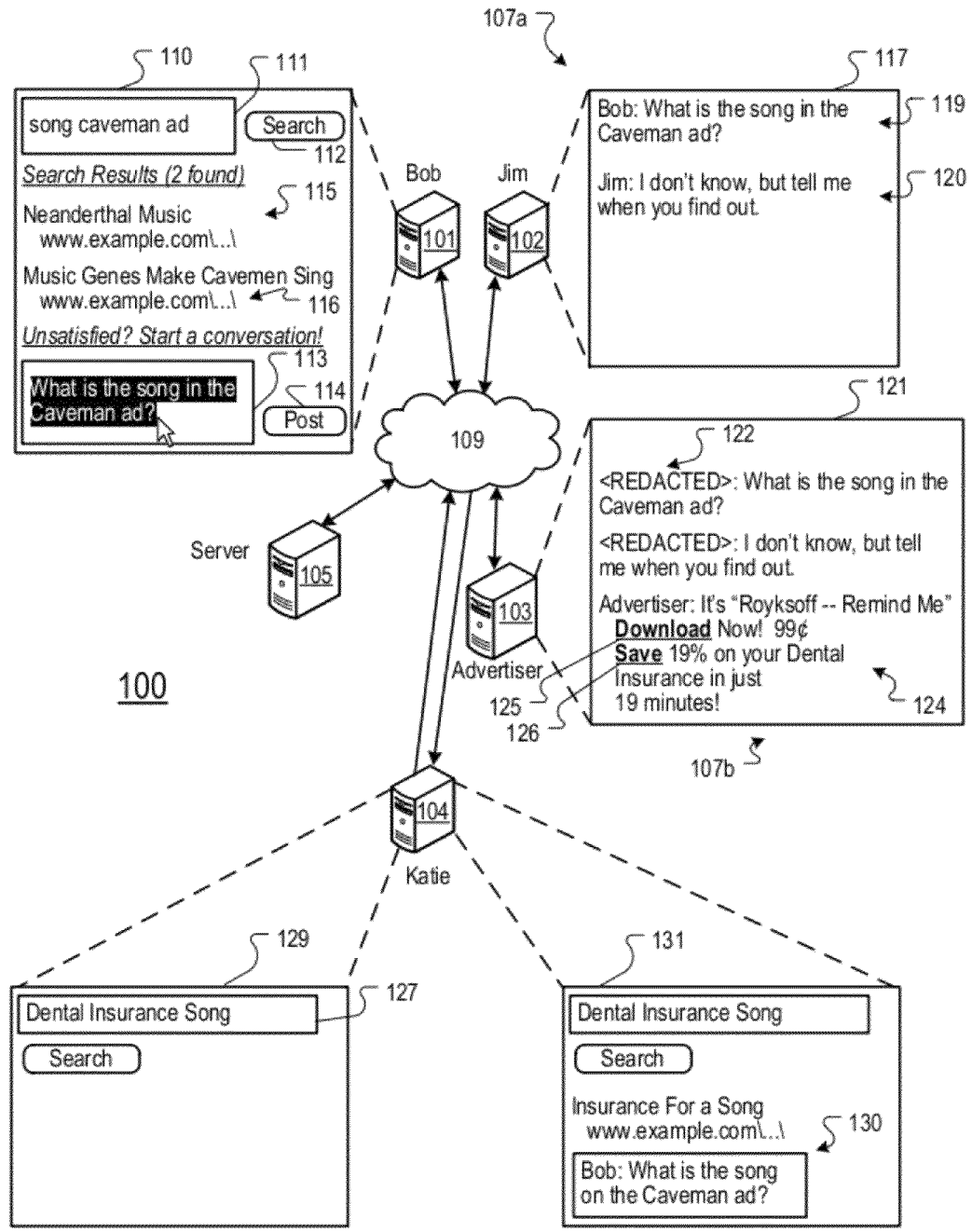
FIGS. 1A and 1B are a diagrams that demonstrate conversational questioning and answering.
Figure 1B:
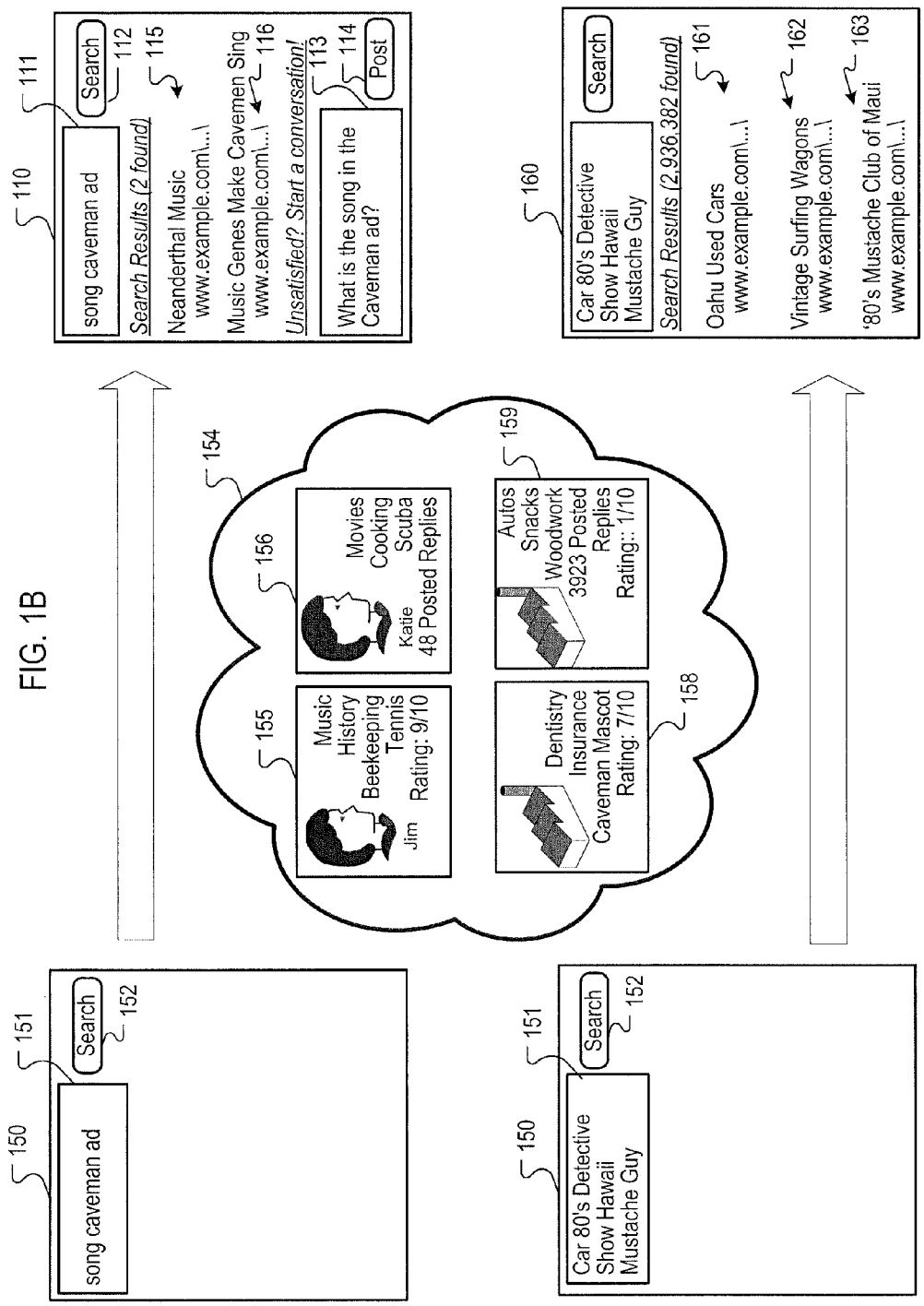

FIGS. 1A and 1B are diagrams that demonstrates conversational questioning and answering. The system 100 illustrated in FIG. 1A includes a client device 101 associated with a first user ("Bob"), a client device 102 associated with a second user ("Jim"), a client device 103 associated with an advertiser, a client device 104 associated with a third user ("Katie"), and a server 105. The server 105 hosts a search engine and a web application or web service that allows users to conduct online conversations (e.g., online conversation 107, illustrated as conversation 107a and 107b in two time-sequenced states). The client devices 102 to 104 and the server 105 are connected by way of a network 109 (e.g., a private network such as a corporate intranet, a public network such as the Internet, or some combination thereof).

The client devices 102 to 104 and the server 105 may be any appropriate type of computing device or system that includes one or more processors, such as a laptop or desktop computer, a mobile telephone, a tablet computer, a personal digital assistant (PDA), or an embedded system. The client devices 102 to 104 and the server 105 may each include a display for outputting the text and/or graphics that make up the various user interfaces used for performing conversational questioning and answering, and may each include input modules (e.g., a touch screen, a mouse, a microphone, or a keyboard) for receiving user inputs.

The first user is attempting to identify a song that he has heard in a television commercial that includes actors that portray cavemen. As illustrated in FIG. 1 B, the first user attempted to identify the name of the song using a search engine (e.g., a search engine that is hosted by the server 105), by initiating a search dialogue on the client device 101 (e.g., by typing in a Uniform Resource Identifier (URI) associated with a search engine home page 150), entering the terms "song caveman ad" into a search box 151 on the search engine home page 150, and selecting a control 152 on the search engine home page 150 to initiate the execution of a search query.

As used by this specification, a "term" (or "query term") includes one or more whole or partial words, characters, or strings of characters; and a "search query" includes the one or more query terms that the user submits to a search engine (i.e., server 105) when the user requests the search engine to execute a search. Among other things, a "result" (or a "search result") of the search includes a URL (e.g., a Uniform Resource Locator (URL)) that references a resource that the search engine determines to the be responsive to the search query. The search result may include other things, such as a title, preview image, user rating, map or directions, description of the corresponding resource, or a snippet of text that has been automatically or manually extracted from or otherwise associated with the corresponding resource.

When the search engine executes a search using the query terms and generates search results, the search engine may infer that the first user may be unsatisfied with the search results, or that the user might be able to identify better information through an online conversation. For example, the search engine may infer that the first user will be unsatisfied with the search results if too many (e.g., more than 10,000, 100,000, or 1,000,000) search results are generated, if too few (e.g., fewer than 10, 100, 1,000) search results are generated, or if the search engine determines that questions that are related to the search query remain unanswered in several other open or closed conversations. Furthermore, the search engine may infer that the first user might be able to identify better information through an online conversation if the search engine is able to identify or select trusted participants that are experts in (or are at least knowledgeable of) the topic of the search query.

In the example illustrated in FIG. 1A, the search engine infers that the first user may be unsatisfied with the search results, or that the user might be able to better identify specific, desired information through an online conversation. For example, the search engine may infer that the user may be unsatisfied with the search results, since only two search results were produced by the search engine, or the search engine may infer that the user might be able to identify better information through an online conversation because several of the trusted participants have specialized knowledge in a topic associated with the query terms. The process of establishing this inference is described in more detail in connection with FIG. 1 B, below.

A search engine results page 110 is generated by the search engine as a result of executing the search query and inferring either that the first user may be unsatisfied with the search results, or that the user might be able to identify better information through an online conversation. The search engine results page 110 includes a search box 111 that displays the query terms that were used to conduct the search, a SEARCH control 112 for initiating a new search, a question entry field 113 for entering a question (or for viewing and editing an automatically-generated question), a POST control 114 for initiating conversational questioning and answering using the query terms (or a question that is associated with the query terms, such as a question entered into the question entry field 113), and search results 115 and 116. Although the first search result 115 ("Neanderthal Music") and the second search result 116 ("Music Genes Make Caveman Sing") appear to be somewhat relevant to the query terms, they do not provide the particular information that the first user is seeking, specifically the name of a song that is played in a television commercial that has actors portraying cavemen.

The first user may have entered the query terms "song caveman ad," under an incorrect assumption that the search engine would not be able to identify any resources other than those which are related to the name of the "song" played in the "caveman ad." Alternatively, the first user may have been aware that other resources might exist, but might have expected that the search engine would rank those web pages that relate to the name of the song in the caveman ad highest among all of the search results. Furthermore, the first user may have relied on the search engine to determine whether the user would be more satisfied with the automatically-generated search results, or whether the user would be better able to identify particular information through an online conversation with trusted participants.

The search session provides results that are disappointing to the user. Accordingly, the search engine results page provides a starting point for the first user to initiate a conversation among a trusted group that includes his friends and paying third-parties, in order to collectively address a particular question. Such a conversation provides an community-based approach to retrieve information that is difficult to locate using a search engine or other automated application or platform.

Instead of restating the search query by altering the terms in the search box 111 and selecting the SEARCH control 112, the first user may attempt to identify the name of the song by initiating a conversation with the first user's social network friends and with unaffiliated third parties who, through their expertise, may be able to answer this question. The search engine may suggest that the user initiate the conversation by including the question entry field 113 and the POST control 114 on the search engine results page 110. The online conversation 107 is initiated when the first user selects the POST control 114.

One or more questions are posed to parties with whom the user is acquainted, as well as to advertisers, all of whom may respond with replies, answers or comments. The parties of the example online conversation 107 illustrated in FIG. 1A include the second user ("Jim") and the third user ("Katie"), who in this example are real people with whom the user has an online relationship, such as social network 'friend' relationship. The parties also include the advertiser associated with the client device 103. The advertiser is a party who the search engine has matched to the conversation based on an expectation that the advertiser has special knowledge on a topic of the question, or based on the advertiser paying for the right to respond to the question or to otherwise participate in the online conversation 107. Other trusted participants may also be included in the online conversation, such as other friends of the first user who are 'lurking,' by reading the online conversation 107 but not posting replies.

The first user may or may not be aware of the identity of the advertisers who will be participating in the online conversation 107 when the first user initiates the online conversation 107. Instead, the first user may assume that advertisers who have special knowledge in the subject of the question will be identified or matched to the conversation 107 by the server 105, and that those advertisers who are identified will be allowed to participate in the online conversation 107 as trusted participants.

Collectively, the user, the parties with whom the user are acquainted, and the paying third parties are considered to be the trusted participants of the online conversation 107. By excluding other parties from the online conversation 107, such as members of the general public, the quality of the questions and answers are improved, aiding both the user who submitted the question and the advertisers who may be paying to participate in the online conversation 107.

The online conversation 107 may be initiated with a question that the user manually enters (e.g., into the search box 111 or the question entry field 113 before selecting the post control 114). Alternatively, the question may initially not be phrased as a natural language question but, where the question is apparent from certain query terms (e.g., the query terms "height of mount Everest") or where the query terms can otherwise be mapped to a question, a natural language question may be automatically generated from the query terms (e.g., by automatically appending interrogative terms such as "what is" or "how high," or by adding, substituting or modifying articles, other terms, or punctuation) using any appropriate number of question generation or query revision strategies. The automatically generated question may be inserted into the question entry field 113 for viewing or editing by the first user. In some implementations, the first user may choose to skip the action of obtaining search engine results, and may proceed instead to initiate conversational question and answer through the search engine home page 150 or another page.

The server 105 matches the question 119 with one or more advertisers (including the advertiser associated with the client device 103), and allows the advertisers that are identified in by the matching operation to participate in the online conversation 107. Matching questions with advertisers who may be experts on a particular topic emphasizes non-confrontational, conversational interaction between participants, providing the advertiser with a lead generation tool, a forum for customer service, and a repository for providing offers. Furthermore, the conversation benefits the advertiser by eliciting context or structure about what the first user wants, where the elicited context or structure might be more specific that the context or structure that the first user might otherwise provide in an initial sales inquiry or cold call.

When more than one advertiser is selected by the search engine, the first user benefits because the question is propagated to multiple experts, alleviating the first user of the burden of repeating their same question over and over. Furthermore, since the first user's friends are participants in the conversation, the advertiser may feel additional social pressure not to respond with misleading, spammy, or dishonest answers or to tender unreasonable offers, lest the advertiser be 'called out' by the first user's friends. In this regard, the first user may feel more confident in entering a business transaction with an advertiser if none of the first user's friends call the advertiser out as being misleading, spammy, or dishonest, or if none of the user's friends publicly or privately remark to the first user that an offer tendered by the advertiser appears to be a bad deal.

Matching the question with an advertiser may include, for example, matching keywords in the question 119 with a list of keywords or topics that are associated with the advertiser, such as a list of keywords that are included on the advertiser's web page. Alternatively, matching the question with the advertiser may include comparing the question to similar questions that have been answered in the past, and identifying advertisers who have provided answers to the similar questions or who have provided answers that have satisfied certain metrics as that are indicative of good answers. Alternatively, advertisers can review questions in real time or review hypothetical questions before they are submitted, and bid against each other for the right to answer each question. Further alternatively, questions can be matched with random advertisers, or with advertisers who have not answered questions for a long period of time. Additionally, an advertiser may be matched to a conversation by another advertiser who is a trusted participant, and who refers the question to the advertiser. Any other appropriate technique for matching questions with advertisers may be used.

The user interface 117 shows the online conversation 107a in a state after the first user has submitted the question 119 and the second user, a social network friend of the first user, has posted a reply 120. Although the reply 120 posted by the second user does not answer the question 120, it continues the conversation 107 that has been started by the question 119, and invites other participants to provide further comments. The user interface 117 may be generated by any appropriate application that hosts a text-based group chat, an Internet forum, a message board, or a web application that manages content that is synchronously or asynchronously provided by different users.

The advertiser may be digital music seller, a company (e.g., an insurance company) that is known for using cavemen in their television commercials, or a third party entity that acts on behalf of the digital music seller and/or the insurance company to answer questions that occur in online conversations. The advertiser may have been matched with the question 119 based on the keyword "song" or "cavemen" in the question 119. Alternatively, the advertiser may have been matched with the question 119 because the advertiser had not answered a question is a long period of time, or because previous replies posted by the advertiser were rated highly by other past users.

As shown in user interface 121, the conversation 107b may be anonymized before it is shown to the advertiser. As referred to by the specification, "anonymizing" refers to the process of removing name, contact (e.g., email address, phone number, screen names), or other identification information from the conversation, for example to prevent or make it more difficult for the advertiser to directly contact the other participants in the online conversation. Anonymizing may benefit the host of the online conversation, who may charge the advertiser additional fees for the right to view the data that would otherwise be anonymized. Furthermore, anonymizing may also benefit the social network friends, who might feel reluctant to participate in the conversation if they believe that advertisers will contact them with unsolicited information.

Anonymizing may occur after the host of the online conversation checks a permission level associated with an advertiser and determines that advertiser does not have a sufficient permission level to view non-anonymized versions of the online conversation. Because different participants may have different permission levels, some of the advertisers may be shown anonymized versions of the online conversation, while others may be shown non-anonymized versions. As shown in the user interface 121, anonymizing of the conversation 107b may occur by redacting the name of the conversation participants.

The advertiser may participate in the online conversation 107b by posting a comment or reply to the question 119, or by asking another question. In user interface 121, the advertiser posts the reply 124, that includes an answer to the question (i.e., the name and artist associated with "the song in the Caveman ad"). The reply 124 includes a link 125 that, when selected by another participant of the conversation, allows the participant to download the song for a fee. The reply 124 also includes a link 126 that, when selected by another participant of the conversation, refers the participant to a web page for a dental insurance company, to obtain a quote. The answer benefits the first user, who obtains the information that they have unable to identify in their past interactions with a search engine, as well as the advertiser, who receives additional exposure if any of the participants of the conversation 107 select the links 125 and 126. Even if none of the participants use the links 125 and 126 to make an immediate purchase, however, the posting of the reply by the advertiser may result in additional intangible benefits if the participants begin to view the advertiser as helpful and customer service oriented, or as being a subject matter expert. The advertiser may select another control on the user interface to refer the question to another advertiser who is not currently participating in the conversation, to allow the other advertiser to become a trusted participant.

The various replies to the question 119 may be edited or deleted by users that possess the appropriate permissions. Participants may also participate in the conversation by applying labels to (or "tagging") the replies to the question 119, such as when a user applies a "Like" label to a reply that the user finds to be correct or particularly helpful. The online conversation 107 may continue until the participants cease posting additional replies or otherwise stop interacting with previously posted replies. The online conversation 107 may be stored in an archive or index on the server 105, either in real-time before the conversation ceases, or after a predetermined amount of time elapses after the last comment or reply is posted. The server 105 may, in conjunction with storing the online conversation 107 in the archive, determine whether the question was answered based on whether replies to the question were posted.

At a later time, the third user ("Katie") may wish to identify the same information as the first user had previously sought, and may enter the query term "Dental Insurance Song" into the search box 127 of the user interface 129. The search engine identifies the conversation 107 as being relevant to these query terms, and includes a search result 130 that references the conversation 107 on the user interface 131. The fact that answers were posted to the question 119 in the conversation 107 may affect whether the conversation 107 appears among the search results, and may affect the ranking of the search result 130.

The conversation 107 may or may not be selected by the search engine as a search result, depending upon the relationship between the third user and participants of the conversation 107, or depending upon privacy settings applied to the conversation 107 by the participants. For example, the conversation 107 may only be selected by the search engine as a search result if the third user is a social network friend with the first user or the second user. Alternatively, if the third user is not a social network friend with the first user or the second user, the conversation 107 may only be selected as a search result by the server if the first user or the second user have applied a "public" label to the conversation 107.

FIG. 1B is a diagram that demonstrates conversational questioning and answering, focusing specifically on the aspect of determining, by a search engine whether to suggest that a user initiate a conversation with trusted participants to obtain an answer to a question. A user may enter query terms into a search box 151 of a search engine home page 150, and select a SEARCH control 152 to initiate the execution of a search query using the entered query terms. The search engine may refer to a pool 154 of candidate trusted participants, including social network friends 155 and 156 of the user and advertisers 158 and 159, and may determine whether any of the candidate trusted participants may have special knowledge in a topic associated with the entered query terms and/or whether any of the candidate trusted participants would be likely to provide answers that would be considered satisfactory to the user.

In the first example, shown at the top left of FIG. 1B, the user has entered the query terms "song caveman ad." The search engine may determine, from information that the users 155 and 156 and the advertisers 158 and 159 have opted to provide to the search engine, that the user 155 has an association with the topic "music," which matches with the query term "song," and that the advertiser 158 has an association with the topic "caveman mascot," which matches with the query term "caveman." The search engine can also check a rating of the advertiser 158 which, at "7/10," may be greater than a predetermined threshold. Since the search engine has identified two candidate trusted participants that may have special knowledge of the topic of the entered query terms, the search engine determines that an online conversation may be beneficial to obtaining an answer to the user's question. Accordingly, the search engine includes a question entry field 113 and a POST control 114 on the search engine results page 110. The search engine may use other information to determine whether the online conversation may be beneficial, for example, the small number (i.e., only two) of search results that were identified as being relevant to the entered query terms.

In the second example, shown at the bottom left of FIG. 1 B, the user has entered the query terms "Car 80's Detective Show Hawaii Mustache Guy" in order to determine the type of car driven by a certain television detective with a mustache, in a certain 1980's television show that was set in Hawaii. The user may have entered this query, for example, in order to find a dealer who sells a similar car, or a toy store that sells a model of the car.

Based on these entered query terms, the search engine may determine that neither of the users 155 or 156 are associated with any of topic that corresponds to the query, but that advertiser 159 has an association with the topic "autos," which matches with the query term "car." The search engine checks the rating of the advertiser 159 which, at "1/10," may be less than a predetermined threshold. That information, combined with data that indicates that the advertiser 159 has posted an inordinately large number of replies, causes the search engine to determine that it would not be beneficial to have a conversation with the advertiser 159 as a trusted participant. Since candidate trusted participants of the pool 154 have been selected by the search engine based on the entered query terms, the search engine generates a search engine results page 160 that includes results 161 to 163, but that does not include a question entry field or a POST control to initiate an online conversation.

Finally, it should be noted that the search engine may still suggest that the user initiate an online conversation even if it identifies only social network friends, or only identifies advertisers. If only social network friends are identified, the online conversation may be initiated without including any advertisers as trusted participants. If only advertisers are identified, the online conversation may be initiated with the identified advertisers and with the social network friends of the user as trusted participants.

Figure 2:
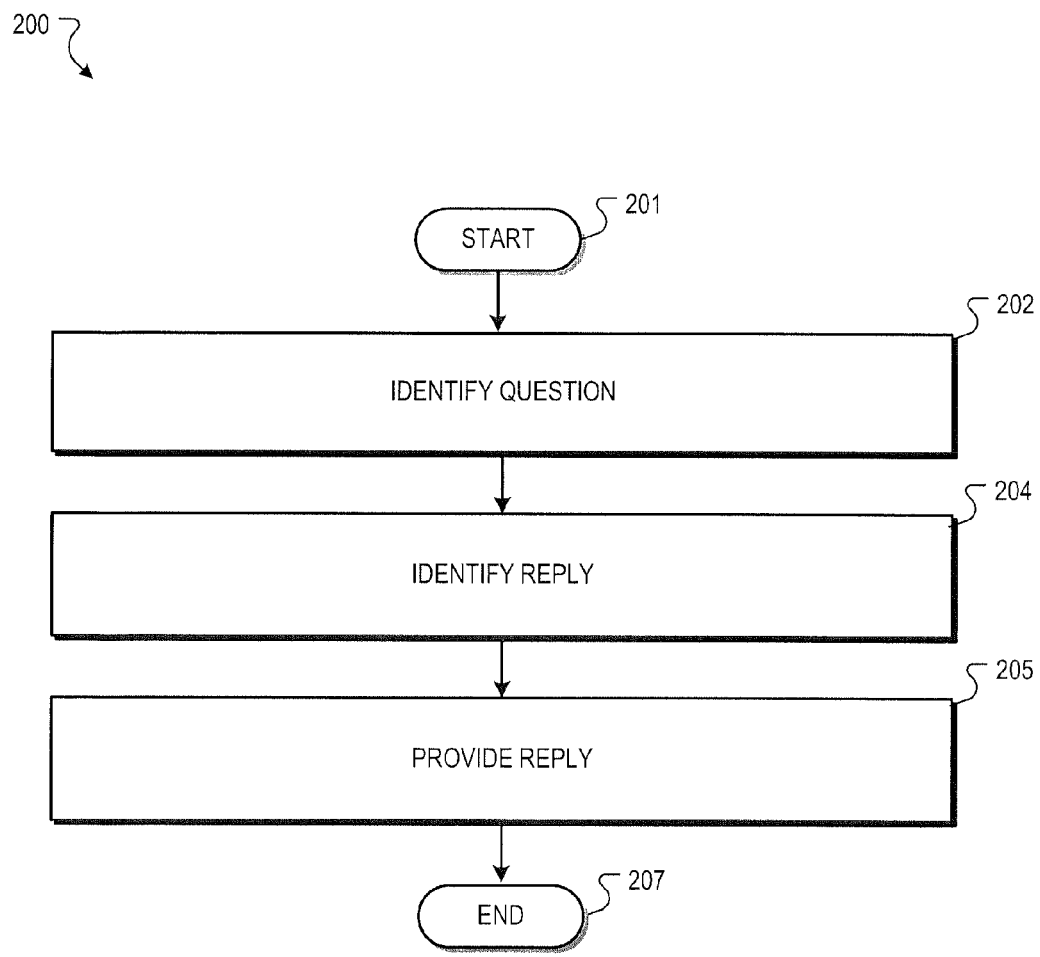
FIGS. 2 and 3 are flowcharts of example processes.

FIG. 2 is a flowchart of an exemplary process 200. Briefly, the process 200 includes the actions of determining that a user has submitted a question to be viewed by trusted participants of an online conversation, where the trusted participants include the user, one or more advertisers and one or more social network friends of the user, obtaining a reply to the question from one of the trusted participants, and providing the reply to the trusted participants.

In more detail, the process 200 begins (201) when a user submits a question or information request (202). The user may submit the question to be viewed by trusted participants only, or the user may submit the question to be viewed by trusted participants and non-trusted participants. Submission of the question may occur after the user attempts to use a search engine and either fails to locate the answer or finds the search experience to be generally unsatisfying, or after the search engine infers that an online conversation may be beneficial to obtaining an answer to the question. The question can be submitted from any source, such as a product search page or a social media website.

The trusted participants may include the user, one or more advertisers, and one or more social network friends of the user. Alternatively, the trusted participants may include just the one or more advertisers and the one or more social network friends, or just the one or more social network friends and the user. Further alternatively, the trusted participants may include the user, one or more advertisers, one or more social network friends, and one or more other people or entities who are neither advertisers nor social network friends.

The one or more advertisers may be parties that are expected to have special knowledge regarding the question, parties that have paid for the right to reply the question, or parties that are otherwise matched to the question by a search engine or by other trusted participants The social network friends may be parties who are acquainted through an online relationship with the user, such as Facebook 'Friends,' Buzz or Twitter 'Followers,' or Linked-in 'Connections." The question may be submitted when the user selects a submission control that may, for example, appear on a search engine home page or results page.

Figure 4:
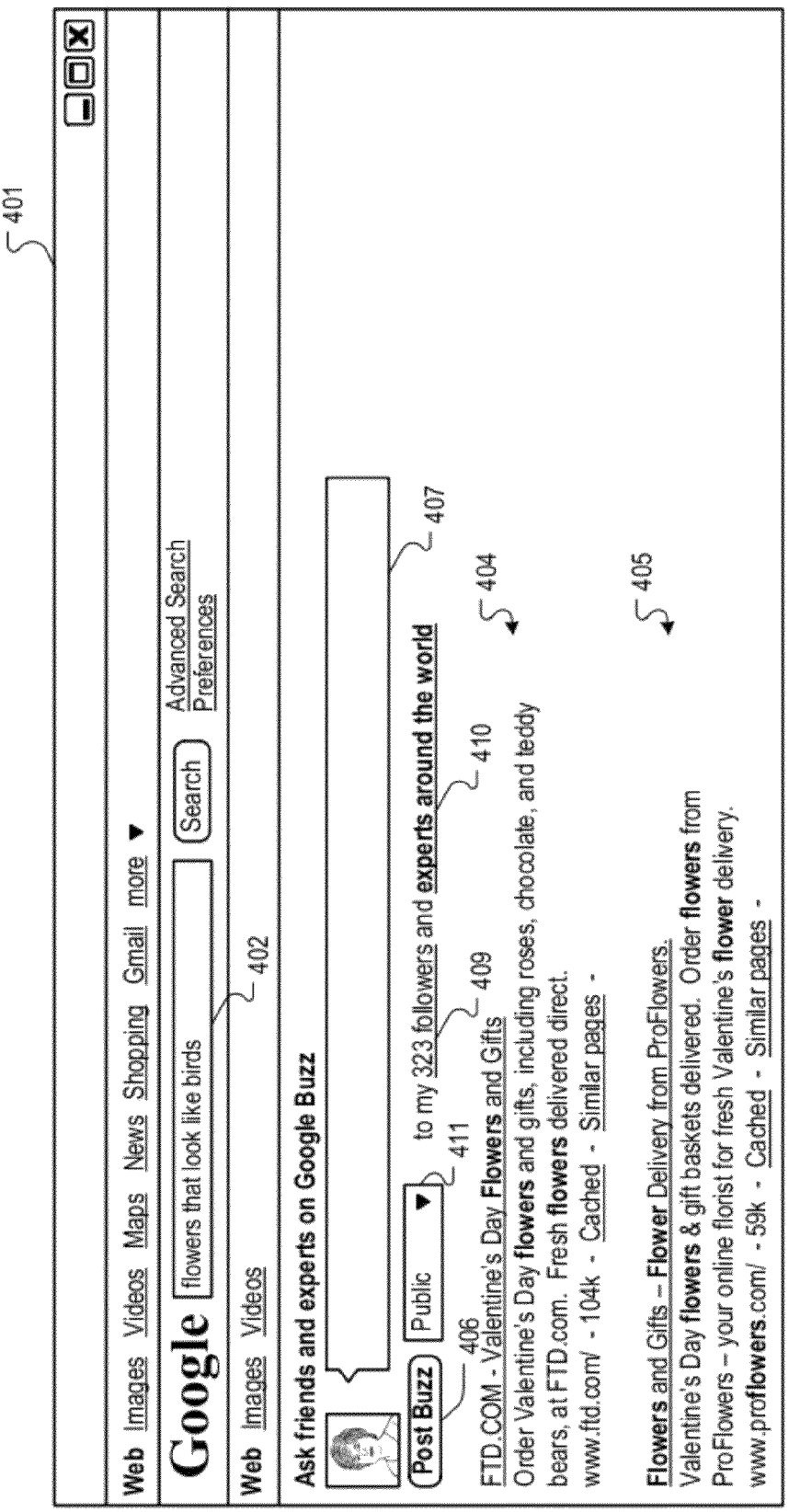
FIGS. 4 to 7 depict example user interfaces.

FIG. 4 illustrates a search engine results page 401 that is generated by a search engine upon executing a search query that uses query terms 402 ("flowers that look like birds"). Although search results 404 and 405 relate to the term query terms 402, the search results 404 and 405 do not answer the question that is inferred by the query terms 402, specifically the question "What is the name of the flowers that look like birds?"

The submission control 406 allows the user to submit a question that is entered into text entry field 407 or that is automatically generated based on the query terms 402. The submission of the question initiates a conversation among the user's followers 409 (e.g., social network friends), and trusted experts 410 (e.g., advertisers). Using the drop down menu 411, the user may alter settings to allow other, non-trusted participants to participate in the conversation, or that allow other, non-trusted participants to view the conversation if the search engine identifies it as being relevant to their subsequent search query.

Figure 5:
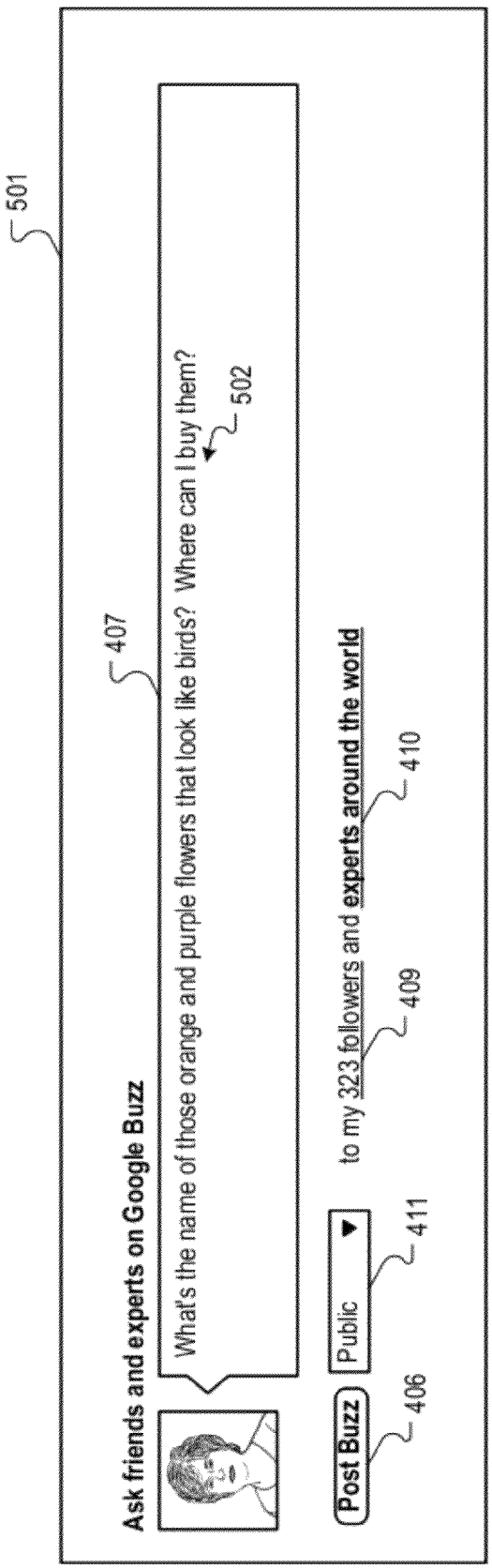

FIG. 5 illustrates a portion 501 of the search engine results page 401, in a state where the user has entered questions 502 ("What's the name of those orange and purple flowers that look like birds? Where can I buy them?") into the text entry field 407. Each of questions 502 may be a natural language question that is formulated by the user and manually entered into the text entry field 407, or each of the questions 502 may be automatically formulated before or after the submission control 406 selected. The user submits the questions 502 by selecting the submission control 406, thereby initiating the conversation.

The questions are shown to the people or entities that are identified as trusted participants of the conversation. For instance, the social network friends of the user may view the question in their respective social media stream. Identifying a person or entity as a trusted participant may involve choosing an advertiser to which a particular question should be routed, for example by identifying an advertiser who has particular expertise in the subject matter of the question.

Replies to the question may be obtained from the trusted participants (204). The replies may include answers to the question or any other comments that may occur in a conversation. For instance, a participant may post a reply that does not relate to the topic of the question, or may post a different question that may cause other advertisers to be matched to the conversation.

Replies are posted by social network friends and by advertisers that have paid to gain response rights for a particular topic or question (205). Parties may be able to view some or all other comments, however the various participants may have different privileges providing ownership over creating, 'liking,' and deleting comments, as well as visibility privileges regarding of user identifying information or user contact information.

Figure 6:
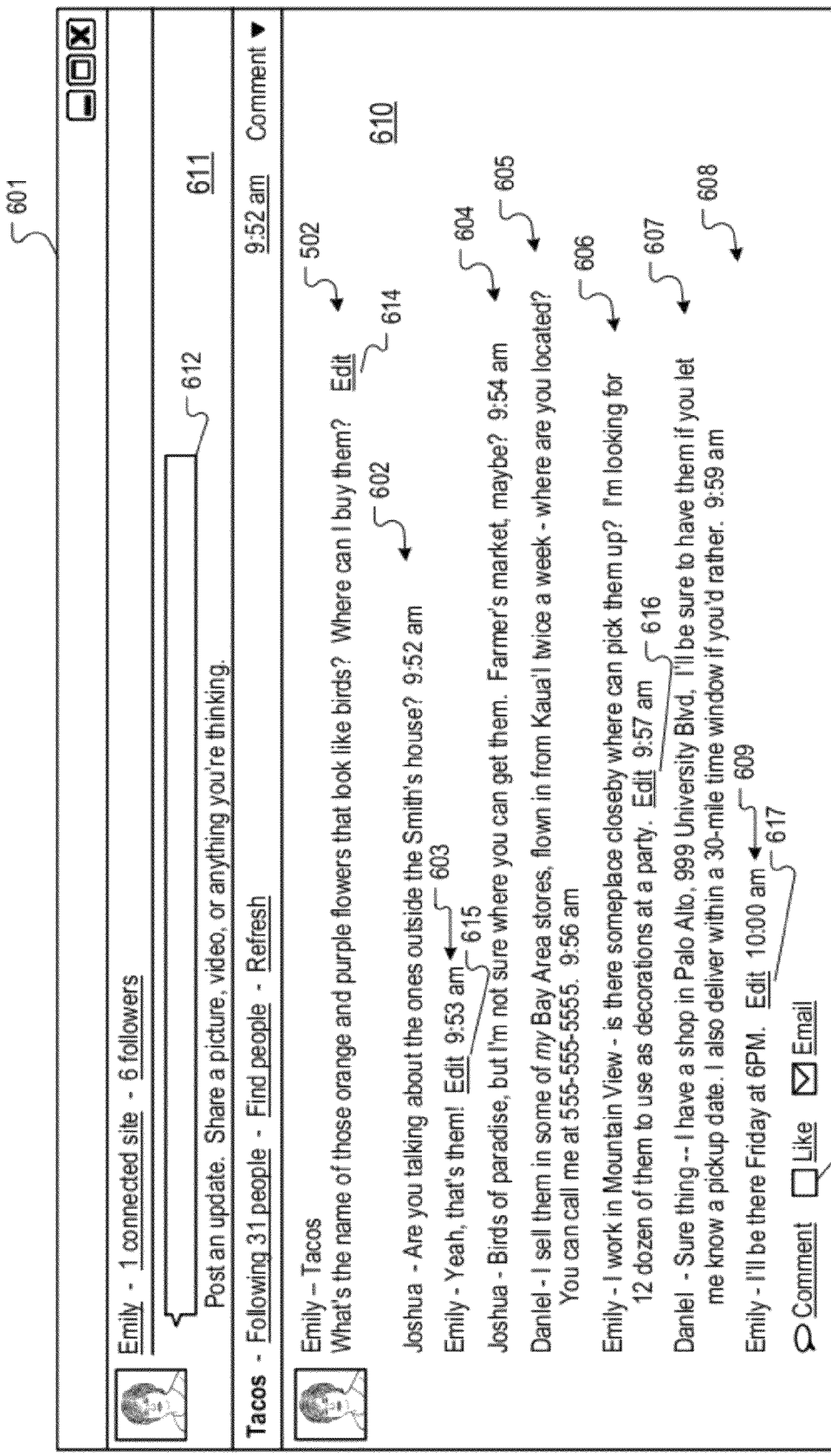

FIG. 6 illustrates a user interface 601, which displays the questions 502 and the replies 602 to 609 to the question. The replies 602 to 609 include replies 602 and 604 from a social network friend of the user ("Joshua"), replies 603, 606 and 609 from the user ("Emily"), and replies 607 from an advertiser ("Daniel") is knowledgeable in the topic posed by the question 502. The question 502 and the replies 602 to 609 are displayed in a conversation region 610 of the user interface 601, which is located adjacent to a text entry region 611. The text entry region 611 includes a text entry field 612 for allowing the user to submit additional questions or to post replies to a question.

The advertiser benefits from the conversation, since he can review the text of the questions 502 and replies 602 to 604, 606, and 609 in order to more fully understand the context or structure of the user's want. Such information provides valuable insight to the advertiser that may be used to generate leads with the user or the social network friends of the user, based on their replies.

Furthermore, the user benefits from the conversation. Specifically, since the user's friends are participants in the conversation, the advertiser may feel additional social pressure not to respond with misleading, spammy, or dishonest answers or to tender unreasonable offers. For example, the advertiser may be more guarded about making claims about their product (i.e., "flown in from Kauai twice a week") if knows that the claims will be viewed and compared by multiple people who he might not be able to identify. In this regard, the user may feel more confident in entering a business transaction with the advertiser when none of the user's friends chime into the conversation to indicate that the advertiser may not be telling the truth, or that the advertiser is otherwise not worthy of the user's business.

Different participants of the conversation may have different permission levels that control whether the user is allowed to add, edit, delete, apply labels to the questions or replies in a conversation, or to designate other parties that are not currently participating in the conversation as trusted participants. In FIG. 6, for example, the user has a sufficient permission level to edit the questions 502 and the replies 603, 606 and 609 using edit links 614 to 617, respectively, and to apply a "Like" label to the conversation or to the question or the replies, using "Like" link 619. The user does not have a sufficient permission level to edit other replies.

The question and any replies to the question may be anonymized before they are viewed by some or all of the trusted participants. For example, the conversation may be anonymized to remove information that identifies the participants of the conversation, before it is shown to an advertiser. If a participant has a sufficient permission level, for example if they have purchased the right to view non-anonymized conversations, the conversation may be viewed by the participant without being anonymized.

Figure 3:
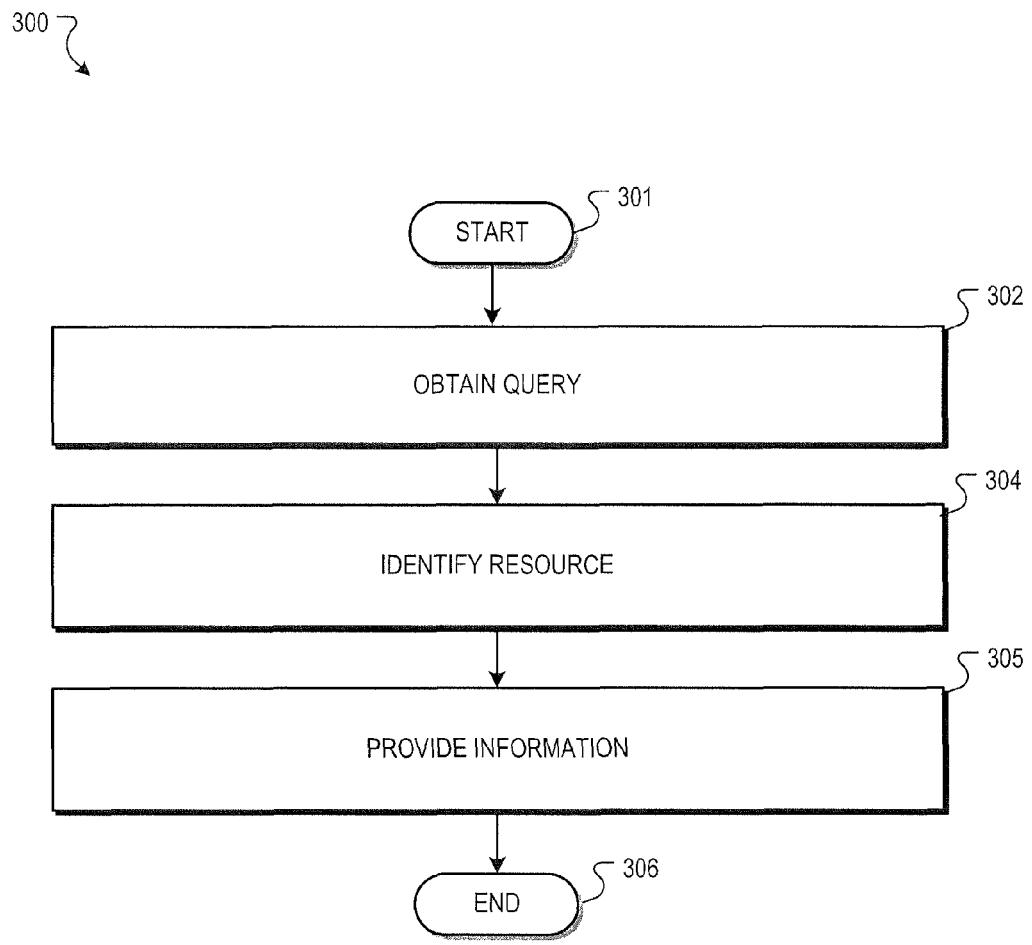

The question, the reply and/or any other information relating to the conversation are stored in a search engine index, thereby ending the process 200 (207). Questions and responses are collected are indexed so that they can be reused in future search requests. This could take the form of learning more fully-formulated queries from traditional queries as well as resurfacing the content collected by thoughtful responses to similar requests in indexed landing pages FIG. 3 is a flowchart of an exemplary process 300. Briefly, the process 300 includes the actions of obtaining a search query, identifying, by a search engine, resources that are responsive to the search query, where the resources include information that references an online conversation in which a user has submitted questions to be viewed by trusted participants and one or more of the trusted participants has replied to the question, and where the trusted participants include the user, one or more advertisers and one or more social network friends of the user, and providing information that identifies the resources for display.

The process 300 begins (301) when a search query is obtained (302). The search query may be obtained when a user enters query terms in a search box, such as a search box on a search engine home page or search engine results page.

A search engine may identify resources that are responsive to the search query (304). The resources include information that references an online conversation in which a user has submitted questions to be viewed by trusted participants and one or more of the trusted participants has replied to the question. The trusted participants may include the user, one or more advertisers and one or more social network friends of the user.

Figure 7:

Information that identifies the resources is provided for display (305), thereby ending the process (306). The information may include one or more search results that include a Uniform Resource Locator (URL) that references a conversation, the question, description of the corresponding resource, or a snippet of text that has been automatically or manually extracted from or otherwise associated with the corresponding resource FIG. 7 illustrates a user interface 701, which is a search engine results page that is generated by a search engine after executing a search query that uses the query terms 702 ("flowers that look like birds"). In addition to identifying search results 704 to 706, which reference web resources that are relevant to the query terms 702, the search engine identifies search result 707, which references the conversation that is illustrated in FIG. 6. The online conversation may only be identified by the search engine if the user that initiated the search query is a social network friend of the user. Accordingly, the conversation may not appear as a search result for another user who is not a social network friend of the user, and who submits the same search query.

Figure 8:
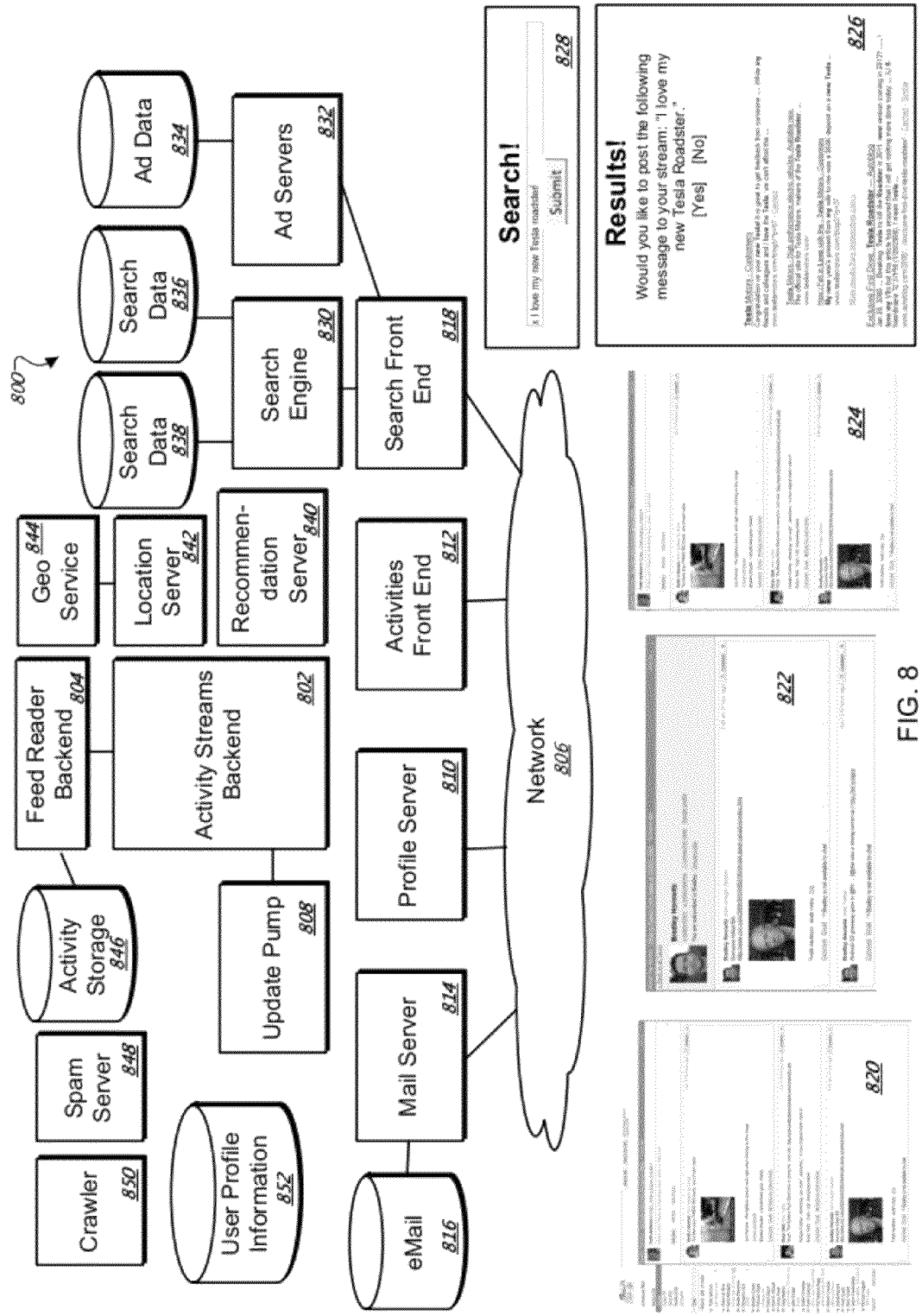
FIG. 8 is a schematic diagram of a system within which the various features described in this document may be implemented.

FIG. 8 is a schematic diagram of a system 800 within which the various features described in this document may be implemented. In general, the system 800 permits various users to post, review, and comment on various activity streams of information, within a social networking framework. For example, a user may make a micro-blogging post about a recent happening in the user's life or about a news article the user recently read. That post may be forwarded to other users who have chosen to follow the first user (who may be an individual or an organization). Those other users may see the post using a stream reader, or the post may be displayed in their email applications (e.g. either in line with their regular email messages or under a separate tab). Those users may choose to comment on the post, and other users may also comment on the post or comment on the comments of other users. Such comments may be included and shown in the various users email application even if they were made after the post was originally connected to the email application. Thus, the various types of feedback may be made available to each user conveniently in one place. Users may also see posts related to other users my visiting profile pages for those other users, and may also go to their own profile pages or to their stream pages to see all of the posts and comments for posts to which they are subscribed.

The various posts, and comments on posts, are managed in the system 800 by an activity streams backend 802, which is in charge of implementing business logic that defines the manner in which various submissions to the system 800 will be handled. The activity streams are characterized by activities, which are the subjects of posts (e.g., micro-blog posts) that users submit to the system 800, and various comments directed toward those activities. For example, a user may post an activity regarding a web page they are currently viewing by pasting a URL of the page into a posting page. Such action may cause the system 800 to gather important information from the URL, including images displayed on the page, headings, labels for images, or topical terms that describe a topic of the page (e.g., as previously determined by analysis of the words on the page, such as using ADSENSE analysis of the page). The system 800 may also obtain location information, such as the current location of the user, and/or a venue with which the user is most currently associated (e.g., that the user checked into recently or identified as a venue in which the user is located).

The activity streams back-end 802 also implements logic for determining what users are to receive posts, comments on posts, and other portions of streams in the system 800. In particular, users who have subscribed to receive posts form other users may be provided with posts when they log into the system 800, users may nominate other users to receive copies of streams when those other users would not ordinarily be included in the streams (e.g., by typing in identifiers for those other users when reviewing a post), and users may send streams directly to each other, among other things.

The feed reader back end 804 manages storage of posts and related data for the system 800. The feed reader back end 804 may rely on various levels of activity storage 846 to store posts, comments, on posts, and other information needed to construct streams for users when they request information from system 800. As with the other components shown in this figure, the feed reader back end 804, though shown as a single block, can be implemented using a number of different servers or server sub-systems. Likewise, the activity storage 846 can be implemented across a number of databases and database types, and across a variety of servers and server sub-systems.

When posts or other updates are received by the activity stream back-end 802, they are formatted and provided to update pump 808. The update pump 808 is responsible for provided notices about newly-posted information to various services that may need such information. It acts, in effect, as a router and distributor of information relating to the system 800. For example, a mail server 814 may include functionality for integrating the display of streams, and may thus need to know about new posts so that users of a mail client can be shown immediately when new information is posted. In a similar manner, a search engine 830 may provide search results to users that include real-time updating information from various posts that users are supplying to the system, and can receive such updated information by interacting with the update pump 808 via understood APIs and remote procedure calls (RPCs) where the two components are sub-components of a larger organization-wide system.

Various web front-ends are provided to permit the system 800 communicate over a network 806, such as the internet (and adjacent supporting networks). For example, the mail server 814 may provide typical web-based electronic mail functionality, though with the integration of posts and comments into users' in boxes, via a mail client 820. For example, streams may show up as discrete messages in user's in box, and may be updated in real time to include the latest comments on the streams and originating posts for the streams. Such content may be active, in that a user may be allowed to interact with it substantially to a level that they could if they were reviewing the streams in a dedicated stream reader. For example, selectable controls may be provided with a stream that is displayed by the email client 820, and a user may choose one in order to post a comment to be added to a stream, without having to leave the context of the message within the email client 820.

A profile server 810 generates code for representing user profiles such as profile 822 of user Joe Blow. The profile page may take the form of a standard feed page from a social networking site, arranged with a list of posts and comments from other users in reverse chronological order. In a similar manner, an activities front end 812 can generate a similar feed for a user's feed page 824, here for a user named Susie User. The profile page 822 and the feed page 824 may be very similar to each other, and can present content similar to that presented as part of a posting or micro-blogging section of mail client 820. In one example, the profile page 822 is what third parties see when they look at the user's account, while the feed page 824 is what the user himself or herself sees.

A search engine 830 and associated search front end 818 may provide a different sort of functionality for the system 800. Specifically, the search front end 818 may allow users to provide posts or comments from non-traditional sources, such as search boxes, e.g., on a search web page or in a search box on a toolbar installed on their machines an operating in concert with their web browsers. Such posts or comments may be submitted by users and may be received by the search front end in a standard manner, just as search requests are. The intent of a user to submit a post rather than a search query (or in addition to a search query) may be determined by syntactical analysis of the submission. In one example, if a query is preceded by the letter "z", with a space after it (screen 828)—a construct that is seldom submitted as a real search query—the system may parse the submission apart and assume, from the syntax, that the user intends to post the remainder of the submitted query as a post to their social network.

Such a post may be made immediately or after confirming with the submitting user that they would like to make a posting. For example, a search results page 826 may be generated that contains actual search results for the submitted query (whether with or without the preceding "z") generated by the search engine 830 using data from index 838 in a conventional manner, and may be displayed below an area that shows the user the form of a proposed post and selectable controls by which the user can edit the post and can then confirm an intent to post the information to friends, followers, or others. The post may then be forwarded by the search front end 818 to the activity streams backend 802, along with identifying information for the user (e.g., a user ID identified from a cookie on the user's computing device when the user is logged onto a broader service that implements the system 800).

Other syntax submitted by a user may produce different results. For example, if a user enters an email address (e.g., of the form "name@domain.com"), the system may identify that syntax as indicating an intent to send the remaining text of the submission as an email message to the user at the provided email address. Likewise, if the user starts a submission with a control character followed by a communication mode identifier, the remainder of the submission may be submitted for posting in tat communication mode, either without or without first presenting the proposed action to the user and confirm that the user intends such a communication to occur. For example, if a user types "z blog I'm having a great time," the syntax may indicate to the system 800 that the user would like to post the submitted phrase "I'm having a good time" to the user's blog (where the identity of the blog may be determined by the system 800 using a user ID stored as a cookie on the user's computing device, and which can be correlated to an account for the user that is in turn correlated to the blog).

The search results and other information (e.g., posts and email messages) may be accompanied by targeted advertisements directed to the search query or other similar information, such as profile information, the text of posts or comments by a user, the text of posts or comments of users who have a relationship with a user (e.g., as friends, followers, or users that the first user follows). Such advertisements may be served, through the search front end 818, or the other front ends 810, 812, 814 to users of the system 800 and may be targeted using techniques like those employed in GOOGLE ADWORDS OR ADSENSE. Such serving of advertisements may depend on ad data in database 834, which may include information about advertisers, the text and other content for the advertisements, bid prices submitted by the various advertisers, and other relevant information needed to serves advertisements that are directed to users and/or streams of information directed from or to the users.

Various location-based services may be integrated with posts or comments, such as by identifying the locations (e.g., lat/long coordinates) or venues (e.g., stores, arenas, bars, or restaurants) from which posts or comments are made. Such services are provided in this example system 800 by a location server 842 and geo service 844. The location server 842 generally provides information about venues or other landmarks in response to receiving location information about a user of system 800. For example, when a user submits a post, geo-coordinates for the user may be provided with the post (e.g., via GPS functionality on the user's mobile computing device) or may be determined for the user by the system 800 (e.g., via cell tower or access point identification or triangulation). The geo-location information may be an estimated latitude and longitude of the mobile computing device and information identifying an accuracy of the estimation. The location server 842 may be made available through an API to various other components of the system 800.

The location server 842 may use such geo-location information to identify one or more venues (e.g., stores, restaurants, or bars) in the general location of the user, may use proximity of the user to each venue and other signals (e.g., popularity of each venue as determined from search queries submitted with the venue name, check-ins at the venue by users of the system 800, a volume of activity associated with posts from the venue, a reputation of a post's author, for example, through number of subscribers, a volume of comments on posts, or a similarly determined reputation of the subscribers) to provide a ranked list of venues in the geographic area that the user may be in. The user may be presented with a single suggestion for a venue or several suggested venues. The user may then select one such venue, and that venue may be associated with the post when other users review it. For example, the post may be accompanied by meta data indicating that the post was "Posted from Dive Bar," and other users may select the name "Dive Bar" to see additional information about the venue, including other posts from the venue, ratings of the venue, streams that belong to the venue (e.g., if a manager of the venue has made the venue a user of the system 800) and other similar information.

The location server 842 may obtain information that it needs to provide such functionality from various external services, such as geo service 844. Geo service 844 may be a service that communicates via standard APIs to receive location information (e.g., lat/long coordinates) and to provide more advanced information in response. The more advanced information may include a street address that is determined to be associated with the lat/long coordinates (e.g., a street address that is nearest to a particular location represented by the lat/long coordinates). The more advance information may also include a list of venue names that are geographically near the particular location, street addresses for the venues, descriptive information for the venues, map tiles that are associated with the particular location, and a relevance score for each venue. The relevance score for each venue may identify how relevant the particular venue is based on any appropriate combination of (i) the received location information, (ii) an accuracy of the received location information, and (iii) a distance between the venue and a location identified by the received location information.

Other components may interact with the components already described to provide additional functionality foe the system 800. For example, a crawler 850 may crawl various posts and comments for the purpose of indexing the content in the system 800, so that, for example, search engine 830 may readily deliver search results that include the latest postings by users to the system 800. Also, spam server 848 may communicate with the activity streams backend 802 and/or the update pump 808 to identify posts or comments that may be inappropriate (e.g., offensive, abusive, or otherwise inappropriate), duplicative, deceptive (e.g., in which one user poses as another user), and to act appropriately with respect to such content (e.g., providing for automatic and/or manual review of the content and perhaps removing the content from the system 800 or making the content hidden).

Finally, a recommendation server 840 may be provided with any new activity or post that is submitted to the system 800 (e.g., via the activity streams back-end 802). The recommendation server 840 may write back to the activity streams backend 802 about the number of people who should receive the activity. Such information may be saved so that the next time a message is sent out about the activity (e.g., a comment on the activity), the new recommended users also get the activity. A quality score can be computed when determining what users should receive an activity, and the score can be determined by factors such as the distance of relationship between a user and other users who have posted to or recommended an activity, interests of a user as identified in the user's profile (e.g., the user is a member of a classic cars group in a social network, and thus is more likely to receive notices about activities relating to classic cars), or interests as identified by posts or other submissions that the user makes, users or activities that the user follows, and the like. A quality threshold may be set by the recommendation server 840 in order to maintain an adequate level of recommendations (not too many and not too few).

Using the components described here, then, the system 800 may provided for integration of various modes of posting and receiving content that is provided in streams, such as micro-blog posts and comments on such posts. Users may post in various ways, including directly into search boxes on search pages or toolbars, so that such users may be more tightly integrated into systems provided by the providers of the pages or toolbars, and may provide posts in contexts with which they are already very familiar. Also, the users may review posts and other content in their email client, also in a manner that is already familiar to them and does not require them to leave a familiar application in order to review such posts. Moreover, the content may be rich for the users, such that it may include information about locations and venues at those locations (from which a reader of the content may obtain additional information, such as from hyperlinks provided in posts), and the users may respond to posts in-line, such as from their email applications. In all these, ways the system 800 may provide a communication facility that allows a user simpler and more complete interaction with friends and with other users, and may increase the level of knowledge that is made available to the users of the system 800.

Figure 9:
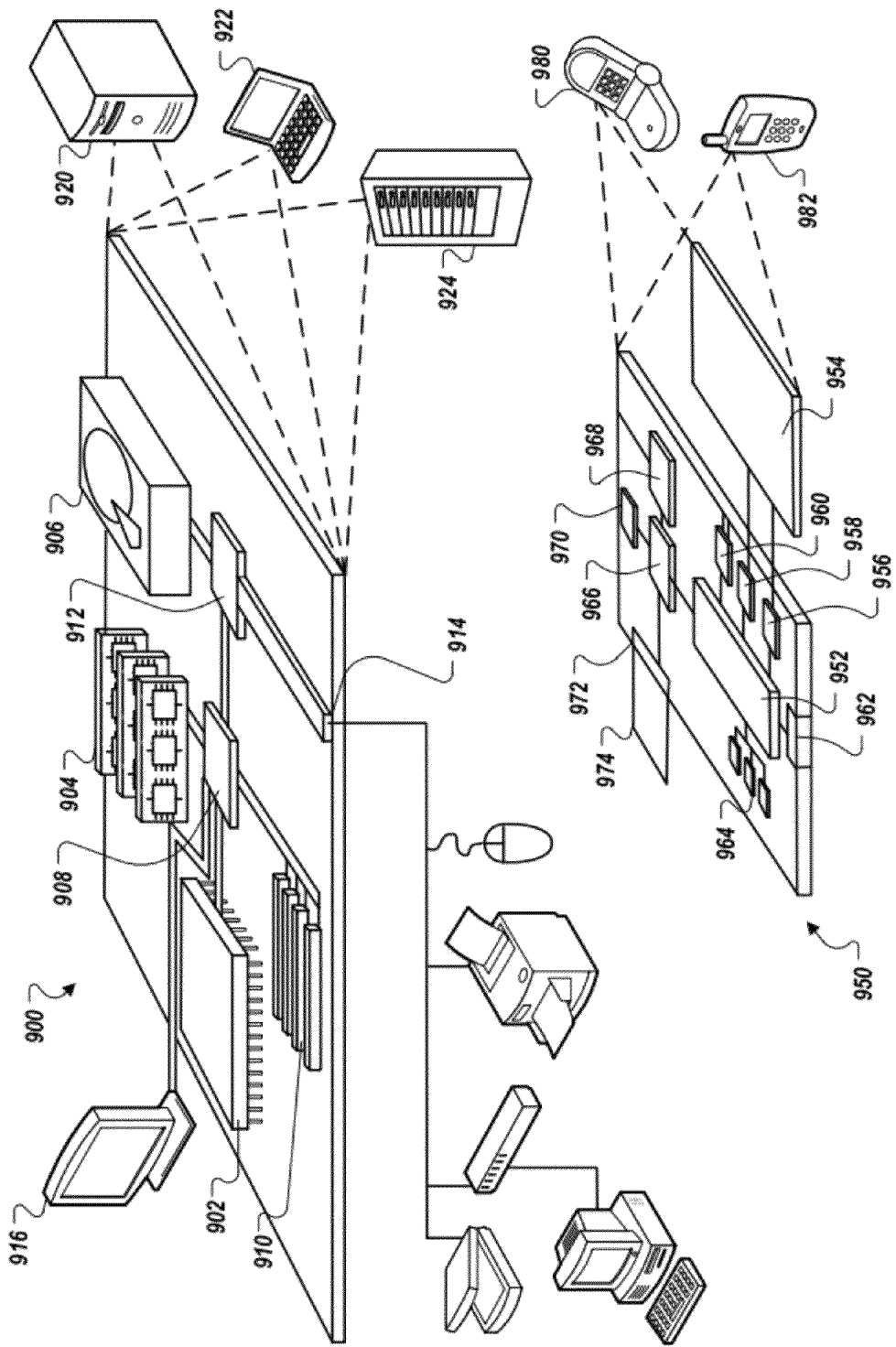
FIG. 9 is a block diagram of computing devices that may be used to implement the systems and methods described in this document, as either a client or as a server or plurality of servers Like reference numbers represent corresponding parts throughout.

FIG. 9 is a block diagram of computing devices 900, 950 that may be used to implement the systems and methods described in this document, as either a client or as a server or plurality of servers. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. Additionally computing device 900 or 950 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 900 includes a processor 902, memory 904, a storage device 906, a high-speed interface 908 connecting to memory 904 and high-speed expansion ports 98, and a low speed interface 912 connecting to low speed bus 914 and storage device 906. Each of the components 902, 904, 906, 908, 98, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 98, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. Additionally, the processor may be implemented using any of a number of appropriate architectures. For example, the processor 48 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any appropriate computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any appropriate signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any appropriate form of sensory feedback (e.g., visual feedback, auditory feedback, or tactile feedback); and input from the user can be received in any appropriate form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any appropriate combination of such back end, middleware, or front end components. The components of the system can be interconnected by any appropriate form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for recommending posts in a messaging service to users that do not subscribe to an author of the post and scoring authors of posts may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A system comprising:
   one or more computers; and a computer-readable medium coupled to the one or more computers having instructions stored thereon which, when executed by the one or more computers, cause the one or more computers to perform operations comprising:
   receiving, from a computing device, a submitted question to be viewed by trusted participants of an online conversation;
   identifying the trusted participants, wherein the trusted participants include one or more social network friends of the user and a plurality of advertisers;
   matching one or more advertisers in the plurality of advertisers to the submitted question based on each of the one or more advertisers having expertise in a topic associated with the question;
   transmitting the submitted question for display in a respective page associated with a respective account of each of the one or more social network friends of the user;
   receiving a reply to the question from one of the trusted participants; and
   providing the reply to the trusted participants, wherein providing the reply to the trusted participants comprises providing the reply for display with the submitted question in the respective page associated with the respective account of each of the one or more social network friends of the user.

2. The system of claim 1, wherein the question is provided to the trusted participants only.

3. The system of claim 1, wherein the social network friends are parties who have identified the user as an acquaintance using a social networking site.

4. The system of claim 1, wherein a particular page associated with a particular account of a particular social network friend of the user is a feed page of the social network friend.

5. The system of claim 1, wherein the operations further comprise:
   receiving information from a particular trusted participant to create, edit, delete, or apply a label to the answer.

6. The system of claim 5, wherein the operations further comprise:
   modifying the answer in accordance with the received information based on determining that a permission level of the particular trusted participant satisfies a threshold associated with creating, editing, deleting or applying the label to the answer, respectively.

7. A method performed by data processing apparatus, the method comprising:
   receiving, from a user, a submitted question to be viewed by trusted participants of an online conversation;
   identifying the trusted participants, wherein the trusted participants include one or more social network friends of the user and a plurality of advertisers;
   matching one or more advertisers in the plurality of advertisers to the submitted question based on each of the one or more advertisers having expertise in a topic associated with the question;
   transmitting the submitted question for display in a respective page associated with a respective account of each of the one or more social network friends of the user;
   receiving a reply to the question from one of the trusted participants; and
   providing the reply to the trusted participants, wherein providing the reply to the trusted participants comprises providing the reply for display with the submitted question in the respective page associated with the respective account of each of the one or more social network friends of the user.

8. The method of claim 7, wherein the social network friends are parties who have identified the user as an acquaintance using a social networking site.

9. The method of claim 7, wherein a particular page associated with a particular account of a particular social network friend of the user is a feed page of the social network friend.

10. The method of claim 7, further comprising:
   receiving information from a particular trusted participant to create, edit, delete, or apply a label to the answer.

11. The method of claim 10, further comprising:
   modifying the answer in accordance with the received information based on determining that a permission level of the particular trusted participant satisfies a threshold associated with creating, editing, deleting or applying the label to the answer, respectively.

12. A non-transitory computer storage medium encoded with a computer program, the program comprising instructions that when executed by data processing apparatus cause the data processing apparatus to perform operations comprising:
   receiving, from a user, a submitted question to be viewed by trusted participants of an online conversation;
   identifying the trusted participants, wherein the trusted participants include one or more social network friends of the user and a plurality of advertisers;
   matching one or more advertisers in the plurality of advertisers to the submitted question based on each of the one or more advertisers having expertise in a topic associated with the question;
   transmitting the submitted question for display in a respective page associated with a respective account of each of the one or more social network friends of the user;
   receiving a reply to the question from one of the trusted participants; and
   providing the reply to the trusted participants, wherein providing the reply to the trusted participants comprises providing the reply for display with the submitted question in the respective page associated with the respective account of each of the one or more social network friends of the user.

13. The computer storage medium of claim 12, wherein the social network friends are parties who have identified the user as an acquaintance using a social networking site.

14. The computer storage medium of claim 12, wherein a particular page associated with a particular account of a particular social network friend of the user is a feed page of the social network friend.

15. The computer storage medium of claim 12, wherein the operations further comprise:
   receiving information from a particular trusted participant to create, edit, delete, or apply a label to the answer.

16. The computer storage medium of claim 15, wherein the operations further comprise:
   modifying the answer in accordance with the received information based on determining that a permission level of the particular trusted participant satisfies a threshold associated with creating, editing, deleting or applying the label to the answer, respectively.

* * * * *